United States Patent Office 2,891,986
Patented June 23, 1959

2,891,986

PRODUCTION OF MATERIALS USEFUL FOR PRODUCING VITAMIN A

Davide R. Grassetti, Richmond, Calif., and Howard C. Klein, Brooklyn, N.Y., assignors to Nopco Chemical Company, Harrison, N.J., a corporation of New Jersey No Drawing. Application August 14, 1956
Serial No. 603,877

10 Claims. (Cl. 260—464)

This invention relates to the preparation of vitamin A and more specifically, relates to the preparation of intermediate compounds which can be employed in the preparation of vitamin A.

The synthesis of vitamin A has engaged the attention of the art since the structure of vitamin A was first disclosed by Karrer in 1933. Many routes for the synthesis of vitamin A have been advanced and a considerable body of literature has developed about the preparation of vitamin A, vitamin A active materials and vitamin A intermediates. Because of the demand for vitamin A and the market which exists for this compound, efforts are constantly being made to devise new and improved methods both for the total synthesis of vitamin A and for the preparation of intermediate compounds which can be employed in the production of vitamin A.

For instance, in Serial No. 545,123 of Klein, Beckmann and Schaaf, filed November 4, 1955, now Patent No. 2,819,310, issued January 7, 1958, and Serial No. 545,125 of Schaaf, Klein and Kapp, filed November 4, 1955, now Patent No. 2,819,308, issued January 7, 1958, methods have been disclosed for the preparation of vitamin A active material by treating either the cis or the trans form of a material having the empirical formula $C_{20}H_{30}O$, which compound contains the beta ionone ring structure, for ethylenic bonds and one hydroxyl group, and which in the trans configuration has an absorption maximum in the ultra-violet at 2710 A., a molecular extinction coefficient at that wave length of 29,100 and has a refractive index at 20° C. of 1.5526, and which in the cis configuration has an absorption maximum in the ultra-violet at 2740, A., a molecular extinction coefficient at that wave length of 25,900 and has a refractive index at 16° C. of 1.5353 (referred to hereinafter as Compound I) with a boron trifluoride hexamethylene tetramine complex under appropriate reaction conditions in a water-containing aromatic hydrocarbon solvent solution or in solution in a solvent selected from the group consisting of acetone, acetonitrile, acrylonitrile, benzyl cyanide, dioxane, isopropenyl acetate and tetrahydrofuran. The resulting product which is vitamin A active is referred to hereinafter as Compound IV. Compound IV contains a hexamethylene tetramine fragment in the molecule.

It is the object of this invention to provide an improved method for the synthesis of vitamin A.

It is a more particular object of this invention to provide a novel and effective method for the production of valuable intermediate compounds useful in the production of vitamin A.

A specific object is the preparation of valuable intermediate compounds for use in the production of vitamin A employing Compound IV as the starting material.

Another object is the oxidation of α and β-ionylidene ethylamine to obtain valuable intermediates for vitamin A production.

Further objects will become apparent from the detailed description given hereinafter. It is intended, however, that the detailed description and the specific examples do not limit the invention but merely indicate the preferred embodiments of the invention since various changes and modifications within the scope of the invention will become apparent to those skilled in the art.

It has been discovered that the above and other objects can be achieved by treating with activated manganese dioxide compounds of a particular class. These compounds are characterized by the fact that they contain all, or at least a major portion of the chromophoric system (i.e., a system of conjugated double bonds) present in the vitamin A molecule. These compounds are primary or secondary amines or else must contain a hexamethylene tetramine fragment in the molecule. However, the primary and secondary amines must have present in their molecule at least one hydrogen atom attached to the carbon atom adjacent to, or alpha to, the nitrogen atom of the amine group. This carbon atom is, of course, the terminal carbon atom of the chromophoric system that is present in the amine. Where there are two hydrogen atoms present on the aforesaid carbon atom, as in the case of β-ionylidene ethylamine, an aldehyde and/or nitrile will result upon reaction with the activated manganese dioxide. On the other hand, if there is only one hydrogen atom present, then a ketone will be formed upon reaction and no nitrile will be formed.

One of the materials of the above described class that is useful for obtaining a valuable intermediate compound which may be employed in vitamin A production is Compound IV, a vitamin A active material obtained by treating the cis or trans form of Compound I with boron trifluoride hexamethylene tetramine complex as described in the aforementioned patent applications.

More specifically, the trans form of Compound I may be prepared by reacting lithium aluminum hydride with a compound having the empirical formula $C_{20}H_{28}O$ which contains the beta ionone ring structure, three ethylenic bonds, one acetylenic bond, and one hydroxyl group, and which has a refractive index at 21° C. of 1.5548 and an absorption maximum at 2670 A. in the ultra-violet with a molecular extinction coefficient at this wave length of 23,800 (this compound is referred to hereinafter as Compound II). The cis form of Compound I is obtained by catalytic hydrogenation of Compound II using hydrogen and a metallic hydrogenation catalyst.

Compound II can be prepared by reacting beta ionone with the Grignard reagent of a compound having the empirical formula $C_7H_8$ and which contains one acetylenic and two ethylenic bonds and which has a refractive index at 17° C. of 1.5158, and absorption maximum in the ultra-violet at 2590 A. with a molecular extinction coefficient at that wave length of 21,500 and distills at 53–54° C. at 90 millimeters of mercury pressure (this compound is referred to hereafter as Compound III), and then hydrolyzing the reaction product to yield the desired Compound II.

It is believed that Compounds I, II and III have the following structural formulas:

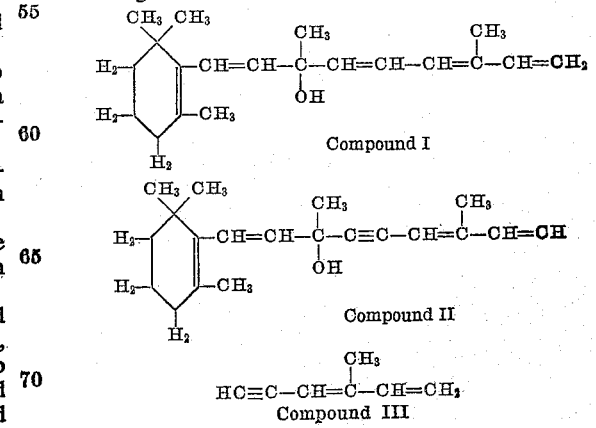

Compound I

Compound II

Compound III

The preparation of the vitamin A active material, i.e. Compound IV, resulting from the processes disclosed in Serial No. 545,123, now Patent No. 2,819,310, and Serial No. 545,125, now Patent No. 2,819,308, is carried out in a relatively dilute solution of Compound I, preferably from about 0.10% to about 1.0% concentration of Compound I in an aromatic hydrocarbon solvent solution or in solution in a solvent selected from the group consisting of dioxane, acetone, acetonitrile, acrylonitrile, benzyl cyanide, isopropenyl acetate and tetrahydrofuran. The boron trifluoride hexamethylene tetramine complex which is employed is one in which the ratio of boron trifluoride to hexamethylene tetramine varies from an average of about 1.5 to an average of about 2.5 molecules of boron trifluoride to each molecule of hexamethylene tetramine. Preferably the complex which is employed contains an average of about 2 molecules of boron trifluoride for each molecule of hexamethylene tetramine. Since the boron trifluoride complex does not act in the normal catalytic sense in the reaction, it has been found that in order to obtain the most satisfactory results when using a complex containing about 2 molecules of boron trifluoride for each molecule of hexamethylene tetramine, it is necessary that the boron trifluoride complex be employed in at least about a mole to mole ratio in proportion to the amount of compound which is used in the reaction. Preferably the reaction is carried out in an inert atmosphere such as an atmosphere of nitrogen, helium or other inert gas and at a temperature between about room temperature and about 35° C.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure of vitamin A, only the amine group has replaced the hydroxyl group of vitamin A. The 9.6% figure is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicate that it contains the vitamin A chromophoric system wherein the hydroxyl group of vitamin A has been replaced by a basic fragment similar to a major portion of the hexamethylene tetramine molecule.

Furthermore, Compound IV is a viscous liquid soluble in ethyl ether, ethyl alcohol, acetone and similar solvents. It has an absorption maximum in the ultra-violet region of the spectrum at 3250 A. and has at that wave length an extinction coefficient of about 1000. If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by the treatments with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

Compound IV can be converted to vitamin A amine by treating it with aluminum isopropoxide in accordance with the procedure disclosed and claimed in Serial No. 545,124, Klein, filed November 4, 1955, now Patent No. 2,819,309, issued January 7, 1958. Also, Compound IV can be converted into vitamin A aldehyde by treating it with iodine in accordance with the procedure disclosed and claimed in Serial No. 545,122, Klein and Grassetti, filed November 4, 1955, now Patent No. 2,819,311 issued January 7, 1958.

Compound IV, obtained by the methods disclosed in the aforementioned applications, is employed as a starting material in the process of the present invention. This material is dissolved in an excess of a suitable inert solvent and to the resulting solution there is then added activated manganese dioxide. The resulting mixture is shaken at room temperature and the vitamin A intermediate which forms is then removed and purified by suitable means.

In a similar manner, other amine compounds which are primary or secondary amines containing a major portion of the vitamin A chromophoric system may be treated with activated manganese dioxide in an inert solvent. These amines must have one or two hydrogen atoms present on the terminal carbon atom of the chromophoric system that is attached alpha to the nitrogen atom of the amine substituent. Again a vitamin A intermediate results which may in turn be converted to vitamin A.

For a fuller understanding of the invention, reference may be had to the following examples which are given merely as further illustrations of the invention and are not to be construed in a limiting sense.

*Example I*

This example describes the procedure for obtaining Compound IV and corresponds to Example I of aforementioned Serial No. 545,123, now Patent No. 2,819,310.

0.050 g. of the trans form of Compound I was dissolved in 14.75 ml. of dioxane and to the resulting clear solution there was added 0.050 g. of boron trifluoride hexamethylene tetramine complex in 0.25 ml. of water, said complex containing an average of about 2 molecules of boron trifluoride for each molecule of hexamethylene tetramine. The mixture thus formed was allowed to stand for three hours with intermittent shaking at room temperature in an atmosphere of nitrogen. Compound IV was then obtained from the reaction mixture by adding an excess of 5% aqueous ammonia, i.e. sufficient to give the reaction mixture an alkaline pH, and then extracting the reaction mixture with hexane. The hexane extracts were washed to neutrality with water, dried over $Na_2SO_4$, filtered and evaporated to dryness to give Compound IV. Compound IV had been formed in a yield of 67% as indicated by ultra violet spectroscopic analysis. On infra-red analysis the presence of an amine band was observed. Upon acetylation of Compound IV an amide band was observed in the infra-red spectrum of the acetylated derivative.

*Example II*

2.0 grams of the product (Compound IV) obtained by treating Compound I with boron trifluoride hexamethylene tetramine complex as described in Example I were dissolved in 300 cc. purified hexane and 30 grams of activated manganese dioxide containing about 14% by weight of water added to the solution. The resulting mixture was then shaken in a closed vessel at room temperature for three hours. At the end of three hours the mixture was filtered and the product was subjected to chromatography in hexane over deactivated alumina. A yield of 0.9 gram of product was obtained. After being rechromatographed, the product had an ultra-violet absorption maximum at 3750 A. and gave the characteristic aldehyde band when subjected to infra-red analysis, and by further nitrogen and aldehyde determinations as well, it was determined that the product contained at least 40% vitamin A aldehyde and 25% vitamin A nitrile.

When the product of this example was reduced with lithium aluminum hydride a substance was obtained which had the characteristic ultra-violet spectrum of vitamin A. This procedure for converting vitamin A aldehyde to vitamin A is described by Wendler et al. in J. Am. Chem. Soc. 72 239 (1950). Also the vitamin A nitrile present in this example reacted with the lithium aluminum hydride and formed vitamin A amine which has the same ultra-violet absorption spectrum as vitamin A and which has 25% of the activity of vitamin A as described by Weisler in Patent No. 2,583,194.

Other materials that may be treated with activated manganese dioxide according to the present invention are illustrated in the following examples.

Example III (a) 0.5 gram of β-ionylidene ethylamine with λmax =235 and 270 mμ respectively and E=522 and 522 respectively [reported by Huisman et al., Rec. Trav. Chim. 71, 899 (1952), as λmax=235 and 265 mμ respectively and E=600 and 600 respectively] was added along with 5 grams of activated manganese dioxide containing about 14% by weight of water to 20 ml. of hexane. The resulting mixture was shaken in a closed vessel at room temperature for one and one-half hours. At the end of this time, the mixture was filtered to remove the manganese dioxide. The ultra-violet spectrum of the filtrate showed λmax=300 mμ and E=480.

(b) The above example was repeated but the mixture or β-ionylidene ethylamine and activated manganese dioxide was shaken for 20 hours instead. After filtration of the mixture at the end of 20 hours, the filtrate had an ultra-violet spectrum of λmax=300 mμ and E=375.

The filtrates obtained from parts (a) and (b) were combined and chromatographed on 10 grams of water deactivated alumina (Merck). Seven fractions were then collected, fractions 1 through 5 in 25 ml. of hexane each and fractions 6 and 7 in 100 ml. of methanol each. Fractions 1 through 3 which had the same ultra violet spectrum were combined and evaporated. These fractions yielded 0.281 gram of product having a λmax=257.5 and 302.5 mμ respectively and E=475 and 548 respectively. This curve was virtually identical with the known β-ionylidene acetonitrile curve reported by Huisman, supra, as λmax=255 mμ and 300 mμ respectively and E=615 and 720 respectively. This product also showed 5% basic amine by titration, calculated as β-ionylidene ethylamine and 77% β-ionylidene acetonitrile calculated from Kjeldahl nitrogen. The yield of crude β-ionylidene acetonitrile was therefore 28%, or a net yield of 21.3%, assuming pure β-ionylidene ethylamine as the starting material. Taking into account the actual purity of β-ionylidene ethylamine which was 87%, the net yield was 25%.

Fractions 4 and 5 were combined and on evaporation of the hexane, 0.58 mg. of impure β-ionylidene acetonitrile was recovered.

Fraction 6 upon evaporation from its methanol solvent yielded 79 mg. of impure β-ionylidene acetaldehyde. This material had a λmax=260-265 mμ and 305-320 mμ respectively and E=310 and 310 respectively. Huisman supra reported a λmax=267 and 310 mμ respectively and E=569 and 670 respectively for pure β-ionylidene acetaldehyde. The crude β-ionylidene acetaldehyde showed the characteristic aldehyde band in the infra-red spectrum and the absence of the nitrile or amine band was noted. The yield was estimated as 5%.

Fraction 7 was recovered from its solvent and contained 0.321 gram of unreacted β-ionylidene ethylamine with λmax=240 and 280 mμ respectively.

B-ionylidene acetonitrile obtained from the above example is a useful intermediate for the synthesis of vitamin A. β-ionylidene acetonitrile may be converted to β-ionylidene acetaldehyde by the procedure taught in British Patent No. 717,904.

β-ionylidene acetaldehyde, also an intermediate for vitamin A, may be converted to vitamin A by the sequence described by Tishler et al. J. Am. Chem. Soc. 73, 721 (1951).

Example IV 0.5429 gram of α-ionylidene ethylamine with λmax =240 mμ and E=720 and shoulders at 260–270 mμ and E=370 was added to 5.43 grams of activated manganese dioxide which was the same as employed in Example II in 21.7 ml. of hexane as solvent. α-Ionylidene ethylamine employed herein is disclosed and claimed in copending application Serial No. 684,645, filed September 18, 1957, which is the invention of one of the coinventors herein, i.e., Howard S. Klein. The above mixture was shaken for 17¾ hours. Thereafter, the manganese dioxide was filtered off and the ultra-violet spectrum of the resulting α-ionylidene acetaldehyde was determined and showed a λmax=282.5 mμ. The reported λmax of α-ionylidene acetaldehyde is 285 mμ and the companion E value is 860. The net yield of α-ionylidene acetaldehyde obtained from α-ionylidene ethylamine according to this example was 52% and the purity was 67.5% (E=640).

The crude α-ionylidene acetaldehyde was chromatographed on 30 grams of water deactivated alumina. Eight fractions were thereafter collected. The best fraction collected contained 78.4 mg. of product with λmax=285 and E=1250. This product came off the column with 15% benzene-hexane and showed an aldehyde band in the infra-red region of the spectrum and virtually no nitrile or amine band. A second fraction having λmax=285 and E=390 came off a column with 50% benzene-hexane and weighed 76 mg. α-ionylidene acetaldehyde may be converted to α-vitamin A as described by Robeson et al., J. Am. Chem. Soc. 77, 4111 (1955).

The α-ionylidene ethylamine employed in the foregoing example may be obtained in the following manner as disclosed in copending Serial No. 684,645, Howard C. Klein, filed September 18, 1957.

50 ml. of ethyl ether was refluxed with 0.5% weight per volume of lithium aluminum hydride for one-half hour and the resulting material distilled at atmospheric pressure. To the distillate was added 1.0 gram of powdered lithium aluminum hydride and this mixture refluxed for 15 minutes. Thereafter, to this mixture, 3.62 grams of α-ionylidene acetonitrile, (λmax=262.5 mμ and E=785, in isopropanol, and $n_D^{25}$=1.5392) contained in 20 ml. of ethyl ether were added dropwise during the course of ten minutes at reflux, the exothermic nature of reaction being sufficient to maintain the reflux temperature. At the end of this addition, the reaction mixture was decomposed by the addition of 15 ml. of water while maintaining the reaction mixture at a temperature of 5° C. Then, the ether solution was decanted from the percipitated lithium salts. The ether solution was thereafter washed with a 10% aqueous solution of potassium hydroxide and then washed with a saturated salt solution. Then the ether solution was dried over sodium sulfate and filtered to remove the latter. Evaporation of the solvent gave 3.4 grams of material having $n_D^{20}$=1.5392 and a new λmax=240 mμ and E=720. This marked shift in spectrum is in line with the λmax for α-ionylidene ethanol which is at 240 mμ and which contains the same chromophoric system as α-ionylidene ethylamine.

As indicated by the foregoing examples, the manganese dioxide employed herein is an activated manganese dioxide because it has been found that commercial samples of precipitated manganese dioxide may have a much lower activity and are often inactive. In the preparation of material of desired activity, regardless of the procedure employed, the drying process is critical and both under- and over-drying can profoundly reduce the activity of the oxide. For instance we have found that rigorous drying by azeotropic distillation wherein virtually all of the water was removed, resulted in an inactive manganese dioxide. A similar effect was observed by adding 15% water to active manganese dioxide already containing 14% by weight of water. Thus it is noted that both too little and too much water used in conjunction with the manganese dioxide markedly affects the activity of this material.

Although all of the examples employ manganese dioxide containing 14% by weight of water, the present process is not restricted solely to this specific quantity of water. This quantity of water may vary both above and below the aforementioned 14% because of the various drying procedures employed in the preparation of the active manganese dioxide. It is obvious that the activity or effectiveness of any specific manganese dioxide can be determined beforehand by taking a small sample of the manganese dioxide and shaking it with a small portion of the material to be treated. The effectiveness of the manganese dioxide in bringing about the desired conversion may then be determined by ultra-violet absorption spectra, or any other convenient and applicable physical measurement. Furthermore, it must be understood that the present invention is not primarily concerned with the specific quantities of water present in the manganese dioxide since one skilled in the art can readily and easily determine whether a particular sample of manganese dioxide will be active or effective in bringing about the desired reaction.

There are various procedures for preparing active manganese dioxides and the present invention is not limited to the use of any specific procedure or any specific manganese dioxide. However, the active manganese dioxide of Attenburrow et al. was found to be satisfactory. This procedure is described in J.C.S. 1094 (1952) and involves the interreaction of potassium permanganate and manganous sulfate. The details of the preparation are described at page 1104 of this publication and are as follows: A solution of 1110 grams of manganese(ous) sulphate tetrahydrate in 1500 ml. of water and 1170 ml. of a 40% solution of sodium hydroxide were simultaneously added, over a period of one hour, to a hot stirred solution of 960 grams of potassium permanganate in 6 liters of water. Manganese dioxide began to precipitate almost immediately as a fine brown solid. Stirring was continued for an additional hour, at the end of which period, the solid was collected with a centrifuge and washed with water until the washings were colorless. The solid was dried in an oven at 100–120° and ground to a fine powder (920 grams) before use.

The particular solvents which are employed in carrying out the novel process of the present invention are not critical. Any solvent inert to the reaction system can be used. Examples of such suitable solvents are hexane, ethyl acetate, chloroform, ethylene dichloride, methylene chloride, and diethyl ether. In general it is necessary to employ an amount of solvent which is in excess of the amount of amine which is employed. While this excess will ordinarily be an amount in the order of about 50 times by weight of the amount of amine which is present, quantities of solvent varying widely from this ratio can be successfully employed such as from 6 to 100 times as much solvent by weight as amine.

The activated manganese dioxide which is employed can also be used in widely varying ratios with respect to the quantity of amine which is present i.e., from about 1 to 15 parts by weight of activated manganese per part by weight of amine. Preferably the activated manganese dioxide will be used in a ratio of about 10 parts by weight of activated manganese dioxide to 1 part by weight of the material being treated.

Inasmuch as the amine and the activated manganese dioxide react upon the simple admixture of said materials, it is unnecessary to employ any particular conditions of temperature or pressure and successful operation can be achieved at room temperature and under atmospheric pressure. However, this does not preclude the use of heat where in some instances, the starting materials and products are stable to more rigorous treatment. The length of reaction time may vary from about 1 hour to about 20 hours depending upon the nature of of the amine and the relative amounts of amine and manganese dioxide. This period of time is not critical, since the longer the length of reaction time with the ratio of the reactants and the temperature held constant, the greater the yield. Hence, it can be said that the reaction time must be sufficiently long enough for the reaction to proceed and yield a desired amount of product.

The desired product can be obtained from the reaction system in a variety of ways. Thus, the product can be recovered from the reaction system by removal of the manganese dioxide by simple filtration. Then the product which is contained in the filtrate can be purified by any appropriate means, e.g. distillation under reduced pressure, chromatography or selective solvent extraction. In the examples given above, purification is carried out by chromatography over deactivated alumina.

It will be appreciated that various modifications can be made in the invention described above without in any way deviating from the scope thereof as defined in the appended claims.

Having described our invention, what we claim as new and desire to secure by Letters Patent is:

1. A process for the preparation of a vitamin A intermediary aldehyde, nitrile or mixture thereof which comprises reacting an amine with activated manganese dioxide in the presence of an inert solvent, said amine being selected from the group consisting of α-ionylidene ethylamine, β-ionylidene ethylamine and an amine having vitamin A activity and having the following characteristics: (1) an absorption maximum in the ultra-violet region of the spectrum at 3250 A. and an extinction coefficient thereat of about 1000, (2) an infra-red pattern with characteristic amine band, (3) when treated with hydrobromic acid, gives a product having an absorption maximum in the ultra-violet region of the spectrum at 3300 A., (4) when treated with phosphoric acid gives a product having an absorption maximum in the ultra-violet region of the spectrum of 3280–3300 A., (5) has a Kjeldahl nitrogen content of about 9.6%, (6) when treated with acetic anhydride gives a product which shows an amide band when subjected to infra-red analysis, (7) when treated with iodine is converted to vitamine A aldehyde, (8) when treated with aluminum isopropoxide is converted to vitamin A amine, (9) contains the vitamin A chromophoric system, and (10) contains as a basic fragment a major portion of the hexamethylene tetramine molecule replaceable by the hydroxyl group of vitamin A.

2. A process for the preparation of a vitamin A intermediary aldehyde, nitrile or mixture thereof which comprises reacting an amine with activated manganese dioxide in the presence of an excess of inert solvent with respect to said amine, said solvent being present in an amount of between about 6 to 100 times by weight of said amine and said activated manganese dioxide being present in an amount of from about 1 to 15 parts by weight per part by weight of said amine, said amine being selected from the group consisting of α-ionylidene ethylamine, β-ionylidene ethylamine and an amine having vitamin A activity and having the following characteristics: (1) an absorption maximum in the ultra-violet region of the spectrum at 3250 A., and an extinction coefficient thereat of about 1000, (2) an infra-red pattern with the characteristic amine band, (3) when treated with hydrobromic acid, gives a product having an absorption maximum in the ultra-violet region of the spectrum at 3300 A., (4) when treated with phosphoric acid gives a product having an absorption maximum in the ultra-violet region of the spectrum of 3280–3300 A., (5) has a Kjeldahl nitrogen content of about 9.6%, (6) when treated with acetic anhydride gives a product which shows an amide band when subjected to infra-red analysis, (7) when treated with iodine is converted to vitamin A aldehyde, (8) when treated with aluminum isopropoxide is converted to vitamin A amine, (9) contains the vitamin A chromophoric system and (10) contains as a basic fragment a major portion of the hexamethylene tetramine molecule replaceable by the hydroxyl group of vitamin A.

3. A process for the preparation of a vitamin A intermediary aldehyde, nitrile or mixture thereof which comprises reacting an amine with activated manganese dioxide at room temperature in the presence of between about 6 to 100 times by weight of said amine of an inert solvent, said activated manganese dioxide being present in an amount from about 1 to 15 parts by weight per part by weight of amine, said amine, being selected from the group consisting of α-ionylidene ethylamine, β-ionylidene ethylamine and an amine having vitamin A activity and having the following characteristics: (1) an absorption maximum in the ultra-violet region of the spectrum at 3250 A., and an extinction coefficient thereat of about 1000, (2) an infra-red pattern with the characteristic amine band, (3) when treated with hydrobromic acid, gives a product having an absorption maximum in the ultra-violet region of the spectrum at 3300 A., (4) when treated with phosphoric acid gives a product having an absorption maximum in the ultra-violet region of the spectrum of 3280–3300 A., (5) has a Kjeldahl nitrogen content of about 9.6%, (6) when treated with acetic anhydride gives a product which shows an amide band when subjected to infra-red analysis, (7) when treated with iodine is converted to vitamin A aldehyde, (8) when treated with aluminum isopropoxide is converted to vitamin A amine, (9) contains the vitamin A chromophoric system, and (10) contains as a basic fragment a major portion of the hexamethylene tetramine molecule replaceable by the hydroxyl group of vitamin A.

4. The process of claim 3 wherein said solvent is hexane.

5. The process of claim 3 wherein said activated manganese dioxide is present in an amount of about 10 parts by weight per part by weight of said amine.

6. The process of claim 3 wherein said amine is α-ionylidene ethylamine.

7. The process of claim 3 wherein said amine is β-ionylidene ethylamine.

8. The process of claim 3 wherein said activated mangenese dioxide contains about 14% by weight of water.

9. The process of claim 3 wherein said amine is a compound having vitamin A activity, said compound having the following characteristics: (1) an absorption maximum in the ultra-violet region of the spectrum at 3250 A. and an extinction coefficient thereat of about 1000, (2) an infra-red pattern with the characteristic amine band, (3) when treated with hydrobromic acid, gives a product having an absorption maximum in the ultra-violet region of the spectrum at 3300 A., (4) when treated with phosphoric acid gives a product having an absorption maximum in the ultra-violet region of the spectrum of 3280–3300 A., (5) has a Kjeldahl nitrogen content of about 9.6%, (6) when treated with acetic anhydride gives a product which shows an amide band when subjected to infra-red analysis, (7) when treated with iodine is converted to vitamin A aldehyde, (8) when treated with aluminum isopropoxide is converted to vitamin A amine, (9) contains the vitamin A chromophoric system, and (10) contains as a basic fragment a major portion of the hexamethylene tetramine molecule replaceable by the hydroxyl group of vitamin A.

10. A process for the preparation of a vitamin A intermediary aldehyde, nitrile or mixture thereof which comprises reacting about 15 grams of activated manganese dioxide per gram of an amine having vitamin A activity at room temperature for about three hours in the presence of an excess of an inert solvent with respect to said amine, said manganese dioxide having about 14% by weight of water and said amine having the following characteristics: (1) an absorption maximum in the ultra-violet region of the spectrum at 3250 A. and an extinction coefficient thereat of about 1000, (2) an infra-red pattern with the characteristic amine band, (3) when treated with hydrobromic acid, gives a product having an absorption maximum in the ultra-violet region of the spectrum at 3300 A., (4) when treated with phosphoric acid gives a product having an absorption maximum in the ultra-violet region of the spectrum of 3280–3300 A., (5) has a Kjeldahl nitrogen content of about 9.6%, (6) when treated with acetic anhydride gives a product which shows an amide band when subjected to infra-red analysis, (7) when treated with iodine is converted to vitamin A, aldehyde, (8) when treated with aluminum isopropoxide is converted to vitamin A amine, (9) contains the vitamin A chromophoric system, and (10) contains as a basic fragment a major portion of the hexamethylene tetramine molecule replaceable by the hydroxyl group of vitamin A.

References Cited in the file of this patent

UNITED STATES PATENTS

| | | |
|---|---|---|
| 2,583,194 | Weisler | Jan. 22, 1952 |
| 2,761,878 | Huisman | Sept. 4, 1956 |
| 2,819,308 | Schaaf et al. | Jan. 7, 1958 |
| 2,819,309 | Klein | Jan. 7, 1958 |
| 2,819,310 | Klein et al. | Jan. 7, 1958 |
| 2,819,311 | Klein et al. | Jan. 7, 1958 |

OTHER REFERENCES

Robeson et al.: J.A.C.S. 77, 4111–19 (1955).